(12) United States Patent
Stephens

(10) Patent No.: US 6,760,734 B1
(45) Date of Patent: Jul. 6, 2004

(54) FRAMEWORK FOR STORING METADATA IN A COMMON ACCESS REPOSITORY

(75) Inventor: Robert Todd Stephens, Sharpsburg, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 435 days.

(21) Appl. No.: 09/851,748

(22) Filed: May 9, 2001

(51) Int. Cl.[7] .............................................. G06F 17/30
(52) U.S. Cl. ............................. 707/102; 707/3; 707/10; 707/103 R
(58) Field of Search ............................. 707/102, 103 R, 707/3, 10

(56) References Cited

U.S. PATENT DOCUMENTS

| | | | | |
|---|---|---|---|---|
| 5,970,490 A | * | 10/1999 | Morgenstern | ................ 707/10 |
| 6,003,039 A | * | 12/1999 | Barry et al. | ............ 707/103 R |
| 6,044,217 A | | 3/2000 | Brealey et al. | |
| 6,044,374 A | * | 3/2000 | Nesamoney et al. | .......... 707/10 |
| 6,240,416 B1 | * | 5/2001 | Immon et al. | ................ 707/10 |
| 6,381,743 B1 | * | 4/2002 | Mutschler, III | ............. 717/104 |
| 6,549,922 B1 | * | 4/2003 | Srivastava et al. | .......... 707/205 |
| 6,598,046 B1 | * | 7/2003 | Goldberg et al. | .............. 707/5 |
| 6,604,110 B1 | * | 8/2003 | Savage et al. | .............. 707/102 |

* cited by examiner

Primary Examiner—Greta Robinson
Assistant Examiner—Debbie M. Le
(74) Attorney, Agent, or Firm—Kirkpatrick & Lockhart LLP

(57) ABSTRACT

A framework for representing metadata in a common access repository. According to one embodiment, wherein the metadata is loaded into the repository from a source system, the system includes a first scanning module for scanning the source system for first set of metadata that describes a first state; a loading module for loading the first set of metadata into the repository; a first state description for the first set of metadata in a fixed state; and a user interface for accessing the metadata.

40 Claims, 9 Drawing Sheets

FIG. 3

| Business View | Metadata View | Representation |
|---|---|---|
| Business Description | Repository | Data Shopper |
| System Description | Collection of Chains | "STEP" Methodology |
| Process Flow | State Chain | State Model |
| Transition Definition | State Link | Link Model |
| State Definition | Fixed Data State Description | State Description Page |
| Scanners | Scanner Inventory | Excel Spreadsheet |
| Metadata Objects | Metadata Object Model | ERwin Diagram |

FIG. 4

| Reference | Class | Description |
|---|---|---|
| 1 | Database | A Table or group of Files that Hold Data |
| 2 | Message Format | A message layout that is used to communicate between systems |
| 3 | Report | A printed report |
| 4 | Screen | User Interface |

FIG. 5

Database Class: 1

*— 75*

| Nbr | Name | Description |
|---|---|---|
| 1.1 | Oracle database | A database system that operates under the Oracle engine. |
| 1.2 | DB/2 MVS | A database system that operates under the MVS or Mainframe environment. |
| 1.3 | AS/400 - DB/2 | A database system that operates under the AS/400 or DB/2 environment. |
| 1.4 | Access | A database system that operates under the Access environment. |
| 1.5 | Other | Any other database system |

*— 76*

| Nbr | Name | Description |
|---|---|---|
| 2.1 | MB Message | A message broker message format |
| 2.2 | Connect Direct | A connect direct file format |
| 2.3 | FTP | A FTP message format |
| 2.4 | Program to Program | A program to program communications structure |
| 2.5 | Other | Any other Message Format |

*— 77*

| Nbr | Name | Description |
|---|---|---|
| 3.1 | Crystal Report | A report generated via Crystal Reports |
| 3.2 | Internal Report | A report that is generated by direct level programming |
| 3.3 | Report Writer | A report that is generated via a report writer |
| 3.4 | Other | A report that is created by other means |

*— 78*

| Nbr | Name | Description |
|---|---|---|
| 3.1 | Web Interface | Web based Interface |
| 3.2 | Internal Screen | A user Interface that is generated by direct level programming |
| 3.3 | Other | A screen that is created by other means |

FIG. 8

ETL: 1 /104

| Nbr | Name | Description |
|-----|------|-------------|
| 1.1 | Decision Base | CA Platinum's ETL Tool |
| 1.2 | Oracle ETL | Oracle's ETL Tool |
| 1.3 | Other | Other ETL Tool |

High Level Program Language: 2 /105

| Nbr | Name | Description |
|-----|------|-------------|
| 2.1 | Program | Program to Program Transformation |
| 2.2 | Other | Other Program Transforation |

Relational Database Systems: 3 /106

| Nbr | Name | Description |
|-----|------|-------------|
| 3.1 | Triggers | Embedded Triggers |
| 3.2 | Stored Proc. | Stored Procedures |
| 3.3 | Other | Other Types of Database Changes |

Document: 4 /107

| Nbr | Name | Description |
|-----|------|-------------|
| 4.1 | Documented | Document Transformation or Use of Data |
| 4.2 | Other | Other ETL Tool |

Message Broker: 5 /108

| Nbr | Name | Description |
|-----|------|-------------|
| 1.1 | MB/DB | Vitria Databus Transformation |
| 1.2 | MQ Series | MQ Series |
| 1.3 | Other | Other Broker Tool Sets |

FIG. 10

| Complexity | Description |
|---|---|
| 1 | Keyed into the System by the Administrator:(Documentation Information) |
| 2 | Keyed into the System by the Administrator:(System Information) |
| 3 | Vendor Provided Scan: Model Scan |
| 4 | Vendor Provided Scan: Database Scan |
| 5 | Vendor Provided Scan: Data Structure Scan |
| 6 | Flat File Scan (Documentation Information) |
| 7 | Flat File Scan (System Information) |
| 8 | High Level Language Code than based into the System |
| 9 | ETL Scan (Using an ETL Tool) |
| 10 | ETL Scan (Not within an ETL Tool) |

FIG. 11

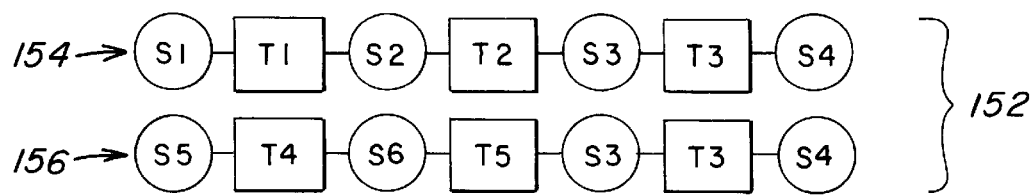

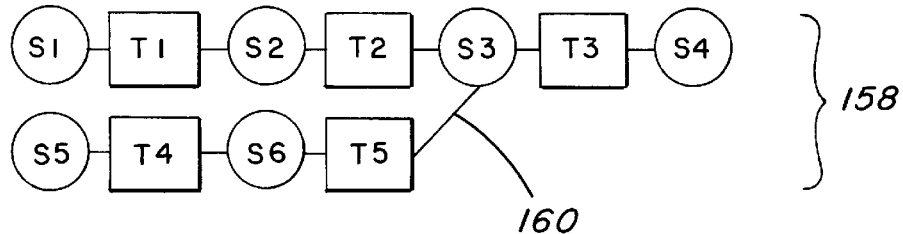

FRAMEWORK FOR STORING METADATA IN A COMMON ACCESS REPOSITORY

BACKGROUND OF THE INVENTION

1. Field of Invention

The present invention relates generally to database management and, more particularly, to a framework for representing metadata in a common access repository.

2. Description of the Background

A data warehouse seeks to gather information from disparate sources, organize it, and make it available to appropriate people within an organization. Just as any other kind of warehouse needs to keep an inventory of its holdings, a data warehouse needs to keep track of what data it is currently holding along with the pedigree of that data. A metadata repository can supplement a data warehouse in that it gives users additional information, in the form of metadata, about information assets stored in the data warehouse such as where the information came from, which rules were used in creating the information, and what the information elements mean.

A repository is an application that manages a wide variety of metadata from many sources, such as database management system (DBMS) catalogs (e.g. Oracle®), development tools like ERwin® and Vitria®, and programming language specific environments such as mainframe COBOL. More specifically, a metadata repository facilitates and supports the storage, use, and retrieval of metadata collected from various data warehouse applications, development projects, and legacy applications and make that information available in an appropriate format to other tools. Repositories manage this metadata independently of other environments, without constraints to specific tools or databases. A repository differs from a "data dictionary" in that respect because the tools and databases associated with a data dictionary, such as Oracle® system catalog and Oracle® Designer 2000, manage only the data dictionary information and nothing else.

A repository may contain three basic types of metadata: technical, business and environmental. Technical metadata (or "back room metadata") describes how business data are mapped to an implementation structure. For example, technical metadata describes how a high level entity relationship (E/R) model is mapped onto a relational database management system (RDBMS) schema. Metadata of this type may include, for example, physical data models, copybooks, data definition language (DDL), or system catalogs. Business metadata (or "front-room metadata") may describe business concepts. Metadata of this type may include logical data models, business rules, transformation rules, and glossaries. Environmental metadata includes statistics about a metadata object. Environmental metadata may include, for example, the date the scan was performed into the repository or the date the metadata object last changed, or what scan brought the object into the repository. This type of metadata may also be used to track statistics about levels of confidence that a particular scorecard would provide as it rates the quality of a data element for accuracy based on some predefined rules. For example, users may resort to environmental metadata to learn how frequently a particular table is updated, or when the last update or load occurred for a table.

The first major-design issue in developing a metadata repository is to develop a process that transforms the metadata into information about the organization. A metadata framework is the final stage of the transformation process that makes the information useful from a user perspective. Metadata by itself, without such a framework, is simply a collection of facts about a process or an application that does not carry much meaning. Thus, a database model or metadata framework is needed that enables organizations to create a common access repository. The framework needs to provide sufficient flexibility to model data stored throughout the enterprise, including data stored on legacy systems. The framework also needs sufficient flexibility to model data in a fixed state and in transition. Such a framework should also be coupled with a simple and user-friendly interface. The framework must also provide some indication of the relative importance of a particular state. Finally, the framework should contain common definitions of terms such as "customer," "payment," and "product."

SUMMARY OF THE INVENTION

The present invention is directed to a framework for representing metadata in a common access repository. According to one embodiment, wherein the metadata is loaded into the repository from a source system, the framework includes a first scanning module for scanning the source system for first set of metadata that describes a first state; a loading module for loading the first set of metadata into the repository; a first state description for the first set of metadata in a fixed state; and a user interface for accessing the metadata.

The framework of the present invention may be used to represent metadata in a common access repository. For example, the present invention may be used in conjunction with data warehouse or enterprise level database services, which store information assets typically without any information about those assets. The present invention provides a framework for representing metadata that describes, for example, where the data came from, which rules were used in creating the data, and what the data elements mean. Thus, the present invention helps derive more value from existing information assets by exploiting metadata.

In addition to database services, benefits of the present invention may also be realized in business applications. For example, the present invention allows such business users to proactively assess the impact of a change throughout an organization by incorporating business rules, data structures, programs, and other organizational information into the metadata architecture.

These and other benefits of the present invention will be apparent from the detailed description below.

DESCRIPTION OF THE FIGURES

For the present invention to be understood clearly and readily practiced, the present invention will be described in conjunction with the following figures, wherein:

FIG. 3 is a schematic diagram of an architecture for representing metadata according to one embodiment of the present invention;

FIG. 4 is table illustrating a state definition that includes four basic classes according to one embodiment of the present invention;

FIG. 5 is a table illustrating four basic classes broken down into sub-classes according to one embodiment of the present invention;

FIG. 8 is a table illustrating a transition definition that includes five basic classes according to one embodiment;

FIG. 10 is a table showing complexity coefficients for a variety of scan types according to one embodiment of the present invention; and FIG. 11 is a diagram illustrating the process for normalizing a state chain.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain specially designed application development tools used in the normal course of constructing a common access repository are not described herein. Those of ordinary skill in the art will recognize, however, that these and other elements may be desirable in a typical common access repository framework. A discussion of such elements is not provided because such elements are well known in the art and because they do not facilitate a better understanding of the present invention.

Figure 1:
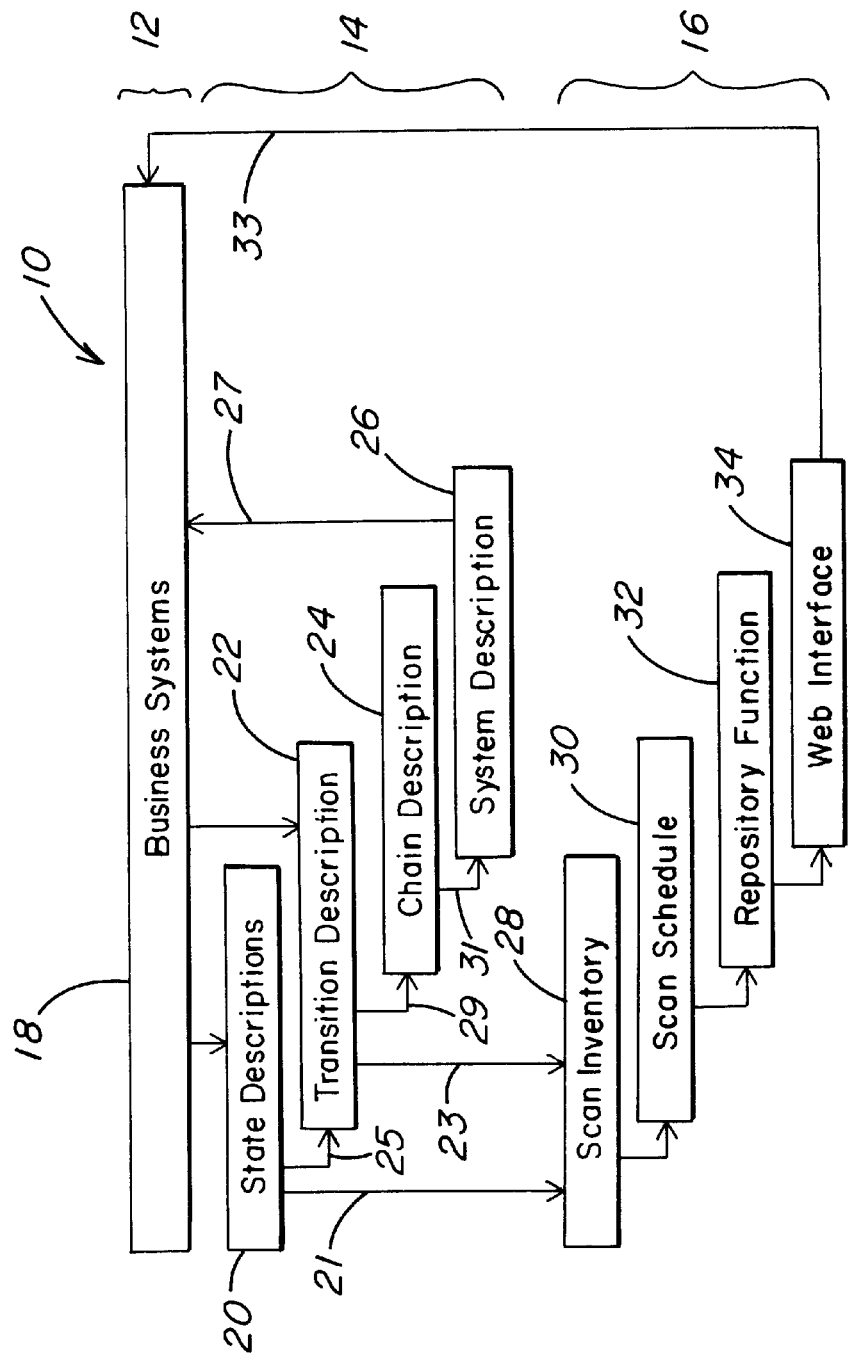
FIG. 1 is a block diagram of a system for representing metadata in a common access repository according to one embodiment of the present invention.

FIG. 1 is a block diagram of a framework 10 according to one embodiment of the present invention for representing metadata in a common access repository. The framework includes three layers: an upper layer 12, a middle layer 14, and a bottom layer 16. The upper layer 12 may represent a myriad of source systems including, but not limited to, tables, databases, such as data marts, data warehouses, and enterprise level databases, enterprise level business applications, and legacy systems (collectively 18) that may contain business critical data, such as data concerning products, customers, or contracts. The middle layer 14 includes a state description 20, a transition description 22, a chain description 24, and a system description 26 for modeling and documenting the user requirements for metadata. Layer 14 is the focus of the present invention and, therefore, is discussed in greater detail hereinbelow. The bottom layer 16 includes a scan inventory 28, a scan schedule 30, a repository function 32, and a web interface 34 for implementing the metadata framework. The web interface 34 displays the information to the users of business systems 18 via communications link 33.

The transition description 22 receives two or more state descriptions 20 via communications link 25 to define a transition state. Chain description 24, in turn, receives state descriptions 20 and transition description 22 via communications link 29. Where transition description 22 shares certain states, chain description 24 may create a state chain when transition description 22 shares certain states. Finally, chain description 24 passes the state chain information to system description 26 via communications link 31. The development of system descriptions is described in greater detail hereinbelow.

The system description 26 communicates with enterprise business systems 18 via a communications link 27. Communications link 27 illustrates a process in which the system description 26 may be verified with the actual business system or subject matter experts. A business and technical review of the system description 26 may identify, for example, bottlenecks in the process that once corrected can improve the speed or quality of the information transfer process.

The system 10 may be implemented, all or in part, on an intelligent platform such as, for example, a computer, such as a workstation or a personal computer, a microprocessor, a network server, or an application specific integrated circuit, using any suitable type of computer instruction. According to one embodiment, system 10 may be implemented as software code to be executed using any suitable computer language such as, for example, Visual Basics®, Java™, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as a CD-ROM. According to one embodiment, each element of system 10 may reside on a separate physical device.

Figure 2:
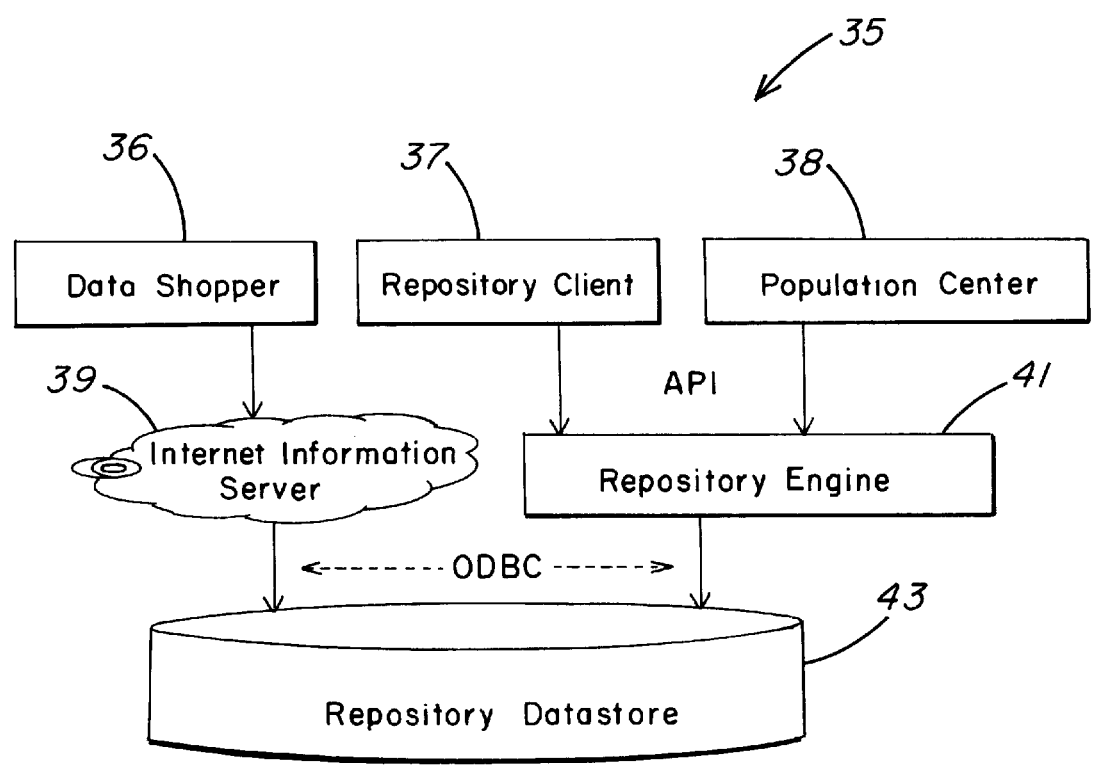
FIG. 2 is a block diagram of a prior art system for managing enterprise metadata.

The repository function 32 is a software tool for acquiring, maintaining, and leveraging metadata throughout an enterprise. According to one embodiment of the present invention, the repository tool 32 is the Platinum Repository/Open Enterprise Edition (PR/OEE). FIG. 2 is a block diagram of a system 35 for managing enterprise metadata according to the PR/OEE implementation. The system 35 includes a data shopper 36, a repository client 37, a population center 38, an Internet information server 39, a repository engine 41, and a repository datastore 43. The data shopper 36 provides the web interface 34 that allows a user to view corporate metadata in the repository from any standard Internet browser in a logical, business-oriented format. The data shopper 36 is designed to provide read-only browsing and analysis capabilities to both business and technical users an efficient manner. According to other embodiments, the web interface 34 may be a client/server arrangement or one using reports. The population center 38 is a software application for importing and exporting metadata stored in application development environments, database systems, and case tool files. In particular, the population center 38 reads the metadata from a source system, maps the metadata to the repository metamodel, and outputs the metadata to the repository or other export format. The repository client 37 is a windows-based GUI application that allows users to access and manipulate repository data from the Microsoft Windows 95/NT® operating system. It should be noted that the repository function 32 is not limited to the metadata types managed by PRO/EE. In other words, the repository function 32 could be any integrated tool that can perform impact analysis by using data structure metadata and transition metadata.

FIG. 3 shows a table 40 illustrating a seven-layer metadata architecture according to one embodiment of the present invention. The table 40 also illustrates, for each layer of the metadata architecture, a business view 42, a corresponding metadata view 44, and a corresponding practical representation 46 according to one embodiment of the present invention. Software tools such as the Platinum Repository/Open Enterprise Edition (PR/OEE) may represent the first two levels 48, 50 of the metadata architecture 40. Lower layers 52, 54 may also be represented using available commercial software in a manner well known to those skilled in the art.

The "state definition" 60 (or the "fixed data state description" under the metadata view 44) describes the "look and feel" of data that is in a fixed state. A fixed state, as used herein, means a state in which the data cannot change unless a program acts on the state. Examples of fixed state data include Oracles® tables, logical and physical data models, screen programs, and reports. Each of these examples represents a state of data. According to one embodiment, the present invention may organize the state definitions 60 by class. For example, FIG. 4 shows a table 70 that describes the state definitions 60 using four basic classes 72 according to one embodiment. According to another embodiment, the classes may be broken down into a plurality of sub-classes. For example, FIG. 5 shows sub-class structures 75, 76, 77, 78 for each class 72 according to such an embodiment. Similarly, the database class 74 may include subclasses Internet Certification Institute International (ICII), DB2®, and Oracle®. Applying these class and sub-class principles to the state definitions 60 can significantly simplify the state definition process.

Referring to FIG. 1, the scan inventory 28 contains a list or inventory of metadata scans 21, 23, wherein a scan is a software tool designed to load certain information into the repository. A repository analyst, for example, may create metadata scans using a variety of software tools including: Open Database Connectivity (ODBC) scanners, Oracle® v.7 and v.8, mainframe Cobol, Job Control Language (JCL) scanners, C/C++, Java™, Visual Basic®, Powerbuilder®, Oracle® designer 2000 v. 1.3, DB/2 4 and 5, or software query language (SQL). Metadata scans 21, 23 may be executed in an automated fashion according to the scan schedule 30 or on an as-needed basis to keep the information on a data bus current. The repository may perform metadata scans on a variety of file types including ERwin® models, database designs, flat file formats, glossary, interface definition language (IDL), and Microsoft Word and Excel files.

Each state definition 60 may require additional information to complete the state description 20. For example, the state description 20 may require a state name, state description, location, state scans, scan connectors, business rules, data stewards, a glossary, or any other information that might be helpful in understanding the state. The state name is simply a short description of the state, such as "ICII Database," "DB2® Database," or "Application Program Interface (API) Message Descriptions." The state description is a detailed description of the use and functionality of the information in the state itself. For example, the state description might convey how this information is used inside the corporate enterprise. The location simply describes where the information is stored, which may depend on the state. For example, the database might reside on several server boxes or in a particular location. This physical location will aid the user in understanding the breadth of the state. State scans are a list or inventory of scans that can be run in an automation format. A repository analyst, for example, may review the current list or suggest a development effort that can create a scan for the particular information they wish to load into the repository. Scan connectors provide guidance as to which scan has precedence when multiple scans incorporate the same information. For example, users may scan both a physical model and a physical Oracle® database into the repository. In this case, the user would need to indicate which scan has precedence. Business rules are the descriptions of the policies and practices of an organization. A data steward is a contact point who may be in the best position to answer questions from users or the repository team concerning the state of data. The name of the data steward will be loaded into the repository and connected to this state entity. The glossary defines terms or acronyms, which may be introduced in the state definitions, for the benefit of the business community. These terms may be loaded into the repository glossary. Once this information is collected, a web page may be created for the user community to review the information and comment.

Figure 6:
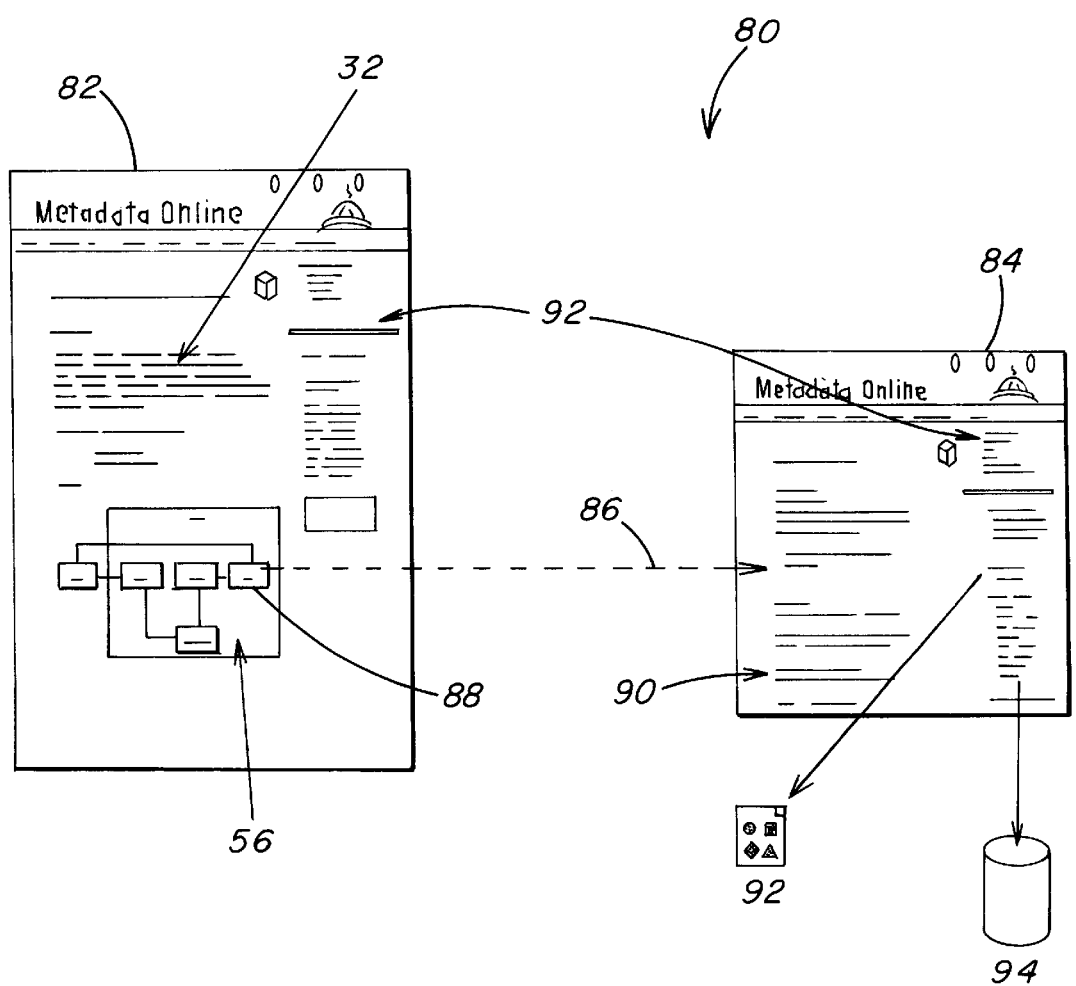
FIG. 6 is a web interface through which users can browse and analyze the metadata according to one embodiment of the present invention.

FIG. 6 shows a user view 80 of the data created from the scan inventory 28 according to one embodiment of the present invention. The user view 80 shows a primary page 82 and a secondary page 84 connected by a direct hypertext link 86. The primary page 82 recites the system description 26 and diagrammatically illustrates the state chain 56. The secondary page 84 contains a mosaic of the state description 20 (for the requested state definition 88) including the class structure 90, a state model diagram 92, and the repository 94. Pages 82 and 84 may also include links to related sites 92. Note that this embodiment does not include transition.

To illustrate the process for using the framework described herein, consider adding an accounts payable database to the metadata repository. The first step requires collecting some information about the accounting database. Assume, for example, the accounting database is an Oracle® database, including logical and physical models, and that the database may be classified as a 1.2 class structure, for example, or in a longer format, Database.Oracle. The prior notation is much simpler and fits better in the modeling language. Next, identify the scans in the scan inventory 28 that would help gather metadata from this database. Note that a state of data can have one or more scans that create the users' view of the data. For the accounting database, the most helpful scans might include scanning the logical and physical models, scanning the Oracle® database, scanning the user-provided data steward information, scanning the user-provided glossary information, and scanning the user-provided or interpreted business rules. All of these scans, once complete, should adequately define the user view of the accounting data. Once all the state descriptions have been collected, the analyst can begin to define the transition descriptions 22.

Figure 7:
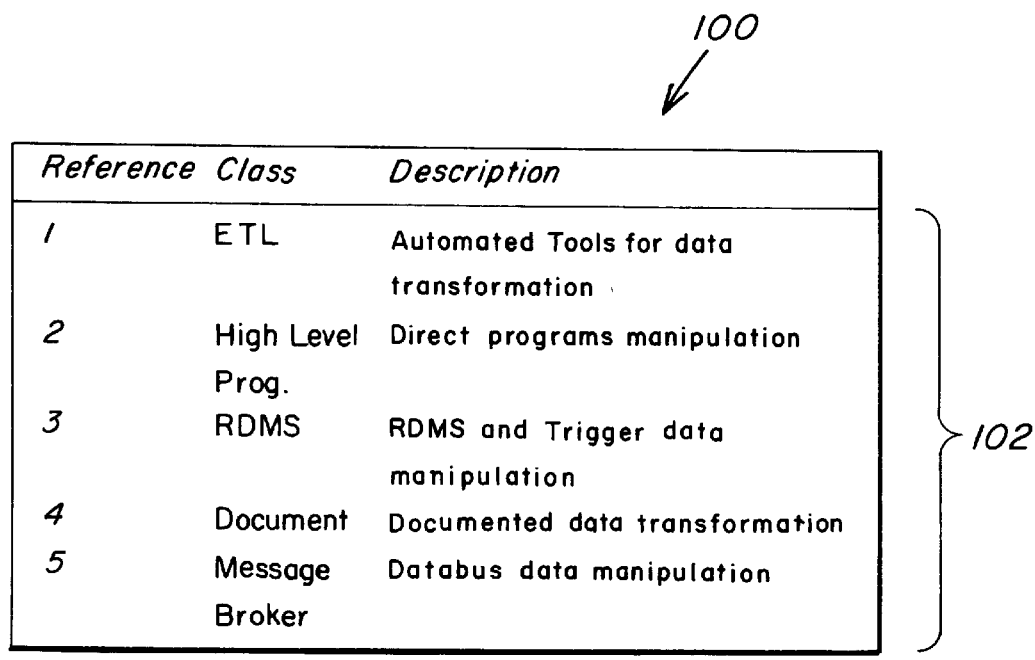
FIG. 7 is a table illustrating a transition definition that includes five basic classes according to one embodiment.

The "transition definition" 58 (or the "state link" under the metadata view 44) describes information or data that cannot be described in a fixed state. This state describes how the information transitions from one state to another. Just like for the state description 20, the transition definition 58 uses the methodology of class, sub-class, complexity, and scanning process. FIG. 7 shows a table 100 that describes the transition definitions 58 using five basic classes 102 according to one embodiment of the present invention. FIG. 8 shows sub-class structures 104, 105, 106, 107, 108 for each class 102 according to another embodiment of the present invention.

Like the state definitions 60, each transition definition 58 may require additional information to complete the transition description 22. The transition descriptions 58 may require all of the information discussed above in connection with the state descriptions 20 including state name, state description, location, state scans, scan connectors, business rules, data stewards, a glossary, or any other information that might be helpful in understanding the state. The transition description 22 must also include a previously defined start and end state.

A transition description 22 may also contain a time component. The time component indicates how long information takes to flow from one system to another. From a business perspective, this is important to understand. Although computer systems can update information almost instantaneously, some jobs run only once a month. According to one embodiment, for an application schedule to run monthly, a time value of 15 days is assigned to reflect the average delay of the update cycle. According to other embodiments, more detail can be added to the time component using a modeling language. For example, the modeling language could be used to add minimum and maximum values or to perform statistical calculations of the time component.

The transition definition 58 may also include a complexity coefficient assigned to the legacy taxonomy for measuring relative importance of a state. The complexity may be defined as a function of the number of connections to that state. If a particular state is highly complex with a large number of connections then there is a high probability that this state is critical to the organization. From an accuracy checking perspective, the complexity coefficient also allows a user or analyst to focus their effort on the most critical states, as identified by its relatively high complexity coefficient.

Scanning transition metadata is more complex than scanning data in a fixed state because the instructions behind the transition are often recited in programming languages such as COBOL, RPG, C, or Java. Thus, the metadata retrieved via the scan would look like the language itself. Business users, consequently, would encounter considerable difficulty in trying to understand business rules written in this format. For this reason, ETL tools are becoming prevalent in the world of process modeling.

According to one embodiment of the present invention, the ETL tools map the transition logic from a start state to an end state by using a series of scans. For example, assume the start state for the accounting database is the database and the end state is a messaging structure that will be used to pass information to a message broker system. The transition may be defined, therefore, by the scanning the ETL descriptions, the user-provided data steward information, the user-provided glossary information, and the user-provided or interpreted business rules. According to another embodiment, the transition state may be defined by deduction (i.e., examining the differences between a start state and an end state). According to another embodiment, the transition information could be entered manually. Finally, according to another embodiment, transition information may be excluded from the model, leaving only fixed states described in the model.

Figure 9:
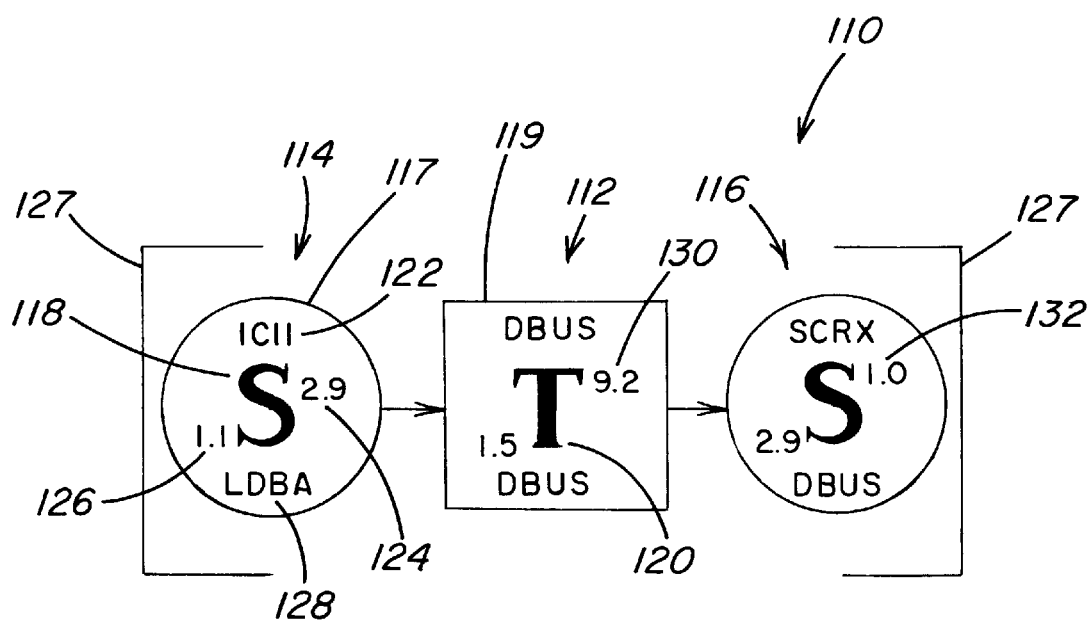
FIG. 9 is a diagram illustrating a state chain.

The links that share states may be combined into a state chain. A chain is an end-to-end view of a set of links that are connected. The chain description 24 may include a series of Transition Descriptions 22 (or "state links" under the metadata view 44) that represent a system. FIG. 9 shows a schematic diagram 110 of a simple state link 112 that connects two fixed data states 114, 116. A circle 117 and an upper case "S" 118 represent the "fixed" state of data. The "transition" state of data is represented by a rectangle 119 and an upper case "T" 120. Each state 112, 114, 116 includes three additional annotations 122, 124, 126. Annotation 120 is a short description of the state. Annotation 124 is the class and sub-class number. Annotation 126 is the complexity coefficient for the state. The final annotation 128 is the taxonomy abbreviation, such as "LDBA" for the Legacy Database Applications or "DBUS" for the databus or message broker. This gives the user a road map to look at the metatdata within this state. The repository is built upon this taxonomy. The brackets 127 of the "STEP" diagram 110 represent a complete chain link. Diagram 110 allows a users to review, for example, state 118 and quickly conclude that this is a database state with a simple level of scans and the information is stored under the Legacy Database Applications topic.

The complexity coefficients for three states 124, 130, 132 described above may be combined to obtain an overall complexity for the chain. According to one embodiment, the link complexity may be calculated as $$\text{Link Complexity} \equiv \sqrt{\text{State1} + \text{State2} + \text{Transition}^{1.5}}$$

For the example presented in diagram 110, the link complexity becomes 5.6. The link complexity result provides some indication of the relative complexity of the link when compared with a group of chains. For example, a complexity in the top 10% of the system complexities may be deemed complex.

The complexity coefficient for a particular state may be defined as, for example, a function of a scan complexity, a class complexity, and the number of connections to that state. According to one embodiment, the state complexity for a state having n scans may be calculated as $$\text{State Complexity} \equiv \sqrt{\frac{\sum_{i=1}^{n} K_{scan}(i)}{\sum_{i=1}^{n} i} * K_{class} * N_{connections}}$$

where $K_{scan}(i)$=complexity coefficient for scan i $K_{class}$=complexity coefficient for the class $N_{connections}$=number of connections FIG. 10 shows a table 140 that includes complexity coefficients for ten scans 142, according to one embodiment of the present invention. The table 140 may provide some guidance for a metadata administrator in assigning a complexity coefficient. Not all scans, however, will fit into the taxonomy. In those cases, the modeler, administrator, and repository architect may need to discuss an appropriate complexity factor.

The system description 26 may include an inventory of state chains that may repeat certain states. A state repeated many times in the system description 26 may be an indicator of the relative importance of the state itself. Normalizing a state chain involves removing the redundant states from the state chain. For example, FIG. 11 shows a pair of state chains 152 in which the last transition state T3 is common to both state chains 154, 156. FIG. 11 also shows a pair of normalized state chains 158 derived from the state chain pair 152 by simply removing the occurrences of S3, S4, and T3 from state chain 68 and point connector 160 up to S3. Note that normalizing the state chain pair 152 does not alter the complexity, time value, relative importance, or overall meaning of the state chain pair 152 in any way.

It should be understood that the invention is not limited by the foregoing description of preferred embodiments, but embraces all such alterations, modifications, and variations in accordance with the spirit and scope of the appended claims.

What is claimed is:

1. A method for representing metadata in a common access repository, wherein the metadata is loaded into the repository from a source system, the method comprising:

scanning the source system for first set of metadata that describes a first state, wherein the first state includes data that cannot change unless a program acts upon the first state;

loading the first set of metadata into the repository;

creating a first state description for the first set of metadata in a fixed state, wherein the first state description includes a state name and a description of a use and a functionality of the state;

creating a transition description wherein the transition description includes a description of how information or data transitions from the first state to a second state;

connecting the first state description to a second state description using the transition description to create a state chain; and determining a state complexity coefficient for the first state, wherein the state complexity coefficient measures a relative importance of the first state.

2. The method of claim 1, further comprising:

scanning the source system for second set of metadata that describes the second state;

loading the second set of metadata into the repository; and creating the second state description for the second set of metadata in a fixed state.

3. The method of claim 2, wherein creating the state description includes:

dividing the state descriptions into state classes.

4. The method of claim 3, wherein creating the transition description includes:

dividing the transition description into transition classes.

5. A system for representing metadata in a common access repository, wherein the metadata is loaded into the repository from a source system, the system comprising:

a first scanning module for scanning the source system for first set of metadata that describes a first state, wherein the first state includes data that cannot change unless a program acts upon the first state;

a loading module for loading the first set of metadata into the repository;

a first state description for the first set of metadata in a fixed state, wherein the first state description includes a state name and a description of a use and a functionality of the state;

a transition description, wherein the transition description includes a description of how information or data transitions from the first state to a second state;

a chaining module for connecting the first state description to a second state description using the transition description to create a state chain; and a state complexity coefficient for the first state, wherein the state complexity coefficient measures a relative importance of the first state.

6. The system of claim 5, further comprising:

a second scanning module for scanning the source system for second set of metadata that describes a the second state; and a loading module for loading the second set of metadata into the repository.

7. The system of claim 6, wherein the state description comprises a plurality state classes.

8. The system of claim 7, wherein the transition description comprises a plurality transition classes.

9. An apparatus for representing metadata in a common access repository, wherein the metadata is loaded into the repository from a source system, the method comprising:

means for scanning the source system for first set of metadata that describes a first state, wherein the first state includes data that cannot change unless a program acts upon the first state;

means for loading the first set of metadata into the repository;

means for creating a first state description for the first set of metadata in a fixed state, wherein the first state description includes a state name and a description of a use and a functionality of the state;

means for creating a transition description, wherein the transition description includes a description of how information or data transitions from the first state to a second state; and means for connecting the first state description to a second state description using the transition description to create a state chain; and means for determining a state complexity coefficient for the first state, wherein the state complexity coefficient measures a relative importance of the first state.

10. The method apparatus of claim 9, further comprising:

means for scanning the source system for second set of metadata that describes a the second state;

means for loading the second set of metadata into the repository; and means for creating the second state description for the second set of metadata in a fixed state.

11. The apparatus of claim 10, wherein creating the state description includes:

means for dividing the state descriptions into state classes.

12. The apparatus of claim 11, wherein creating the transition description includes:

means for dividing the transition description into transition classes.

13. A computer-readable medium having stored thereon instructions which, when executed by a processor, cause the processor to perform the steps of:

scanning a source system for first set of metadata that describes a first state, wherein the first state includes data that cannot change unless a program acts upon the first state;

loading the first set of metadata into a repository;

creating a first state description for the first set of metadata in a fixed state, wherein the first state description includes a state name and a description of a use and a functionality of the state;

creating a transition description, wherein the transition description includes a description of how information or data transitions from the first state to a second state;

connecting the first state description to a second state description using the transition description to create a state chain; and determining a state complexity coefficient for the first state, wherein the state complexity coefficient measures a relative importance of the first state.

14. The medium of claim 13, further comprising:

scanning the source system for second set of metadata that describes the second state;

loading the second set of metadata into the repository; and creating the second state description for the second set of metadata in a fixed state.

15. The medium of claim 14, wherein creating the state description includes:

dividing the state descriptions into state classes.

16. The medium of claim 15, wherein creating the transition description includes:

dividing the transition description into transition classes.

17. A method for representing metadata in a common access repository, wherein the metadata is loaded into the repository from a source system, the method comprising:

scanning the source system for first set of metadata that describes a first state;

loading the first set of metadata into the repository;

creating a first state description for the first set of metadata in a fixed state, wherein creating the first state description includes dividing the state descriptions into state classes;

creating a user interface for accessing the metadata;

scanning the source system for second set of metadata that describes a second state;

loading the second set of metadata into the repository;

creating a second state description for the second set of metadata in a fixed state;

creating a transition description of a transition state based on the first state and the second state, wherein creating the transition description includes dividing the transition description into transition classes;

connecting the first state description to the second state description using the transition description to create a state chain; and determining a state complexity coefficient for the first state, wherein the state complexity coefficient measures a relative importance of the first state.

18. The method of claim 17, further comprising:

determining the state complexity coefficient for the second state.

19. The method of claim 18, further comprising:

determining a link complexity coefficient for the transition state based on at least two fixed states and at least one transition state, wherein the link complexity coefficient measures a relative importance of the state chain.

20. The method of claim 19, further comprising:

representing the state chain using a consistent set of notation.

21. The method of claim 20, further comprising:

normalizing the state chain by eliminating repeated states.

22. The method of claim 21, further comprising:

calculating a time for moving data from the first state to the second state.

23. A system for representing metadata in a common access repository, wherein the metadata is loaded into the repository from a source system, the system comprising:

a first scanning module for scanning the source system for first set of metadata that describes a first state;

a loading module for loading the first set of metadata into the repository;

a first state description for the first set of metadata in a fixed state, wherein the state description comprises a plurality state classes, and wherein the first state description includes a state complexity coefficient, and wherein the state complexity coefficient measures a relative importance of the first state;

a user interface for accessing the metadata;

a second scanning module for scanning the source system for second set of metadata that describes a second state;

a loading module for loading the second set of metadata into the repository;

a second state description for the second set of metadata in a fixed state;

a transition description of a transition state based on the first state and the second state, wherein the transition description comprises a plurality transition classes; and a chaining module for connecting the first state description to the second state description using the transition description to create a state chain.

24. The system of claim 23, wherein the second state description includes a state complexity coefficient, wherein the state complexity coefficient measures the relative importance of the second state.

25. The system of claim 24, wherein the transition description includes a link complexity coefficient, wherein the link complexity coefficient measures a relative importance of the state chain.

26. The system of claim 25, further comprising:

a notation module for representing the state chain using a consistent set of notation.

27. The system of claim 26, further comprising:

a normalization module for normalizing the state chain by eliminating repeated states.

28. The system of claim 27, further comprising:

an impact module for calculating a time for moving data from the first state to the second state.

29. An apparatus for representing metadata in a common access repository, wherein the metadata is loaded into the repository from a source system, the method comprising:

means for scanning the source system for first set of metadata that describes a first state;

means for loading the first set of metadata into the repository;

means for creating a first state description for the first set of metadata in a fixed state, wherein the first state description includes means for dividing the state descriptions into state classes;

means for creating a user interface for accessing the metadata;

means for scanning the source system for second set of metadata that describes a second state;

means for loading the second set of metadata into the repository;

means for creating a second state description for the second set of metadata in a fixed state;

means for creating a transition description of a transition state based on the first state and the second state, wherein the transition description includes means for dividing the transition description into transition classes;

means for connecting the first state description to the second state description using the transition description to create a state chain; and means for determining a state complexity coefficient for the first state, wherein the state complexity coefficient measures the a relative importance of the first state.

30. The apparatus of claim 29, further comprising:

means for determining the state complexity coefficient for the second state.

31. The apparatus of claim 30, further comprising:

means for determining a link complexity coefficient for the transition state based on at least two fixed states and at least one transition state, wherein the link complexity coefficient measures a relative importance of the state chain.

32. The apparatus of claim 31, further comprising:

means for representing the state chain using a consistent set of notation.

33. The apparatus of claim 32, further comprising:

means for normalizing the state chain by eliminating repeated states.

34. The apparatus of claim 33, further comprising:

means for calculating a time for moving data from the first state to the second state.

35. A computer-readable medium having stored thereon instructions which, when executed by a processor, cause the processor to perform the steps of:

scanning a source system for first set of metadata that describes a first state;

loading the first set of metadata into a repository;

creating a first state description for the first set of metadata in a fixed state, wherein creating the first state description includes dividing the state descriptions into state classes;

creating a user interface for accessing the metadata;

scanning the source system for second set of metadata that describes a second state;

loading the second set of metadata into the repository;

creating a second state description for the second set of metadata in a fixed state;

creating a transition description of a transition state based on the first state and the second state, wherein creating the transition description includes dividing the transition description into transition classes;

connecting the first state description to the second state description using the transition description to create a state chain; and determining a state complexity coefficient for the first state, wherein the state complexity coefficient measures the a relative importance of the first state.

36. The medium of claim 35, further comprising:

determining the state complexity coefficient for the second state.

37. The medium of claim 36, further comprising:

determining a link complexity coefficient for the transition state based on at least two fixed states and at least one transition state, wherein the link complexity coefficient measures a the relative importance of the state chain.

38. The medium of claim 37, further comprising:

representing the state chain using a consistent set of notation.

39. The medium of claim 38, further comprising:

normalizing the state chain by eliminating repeated states.

40. The medium of claim 39, further comprising:

calculating a time for moving data from the first state to the second state.

* * * * *